April 13, 1926.
J. C. GAY ET AL
1,580,241
VEHICLE BODY
Filed June 29, 1923    2 Sheets-Sheet 2
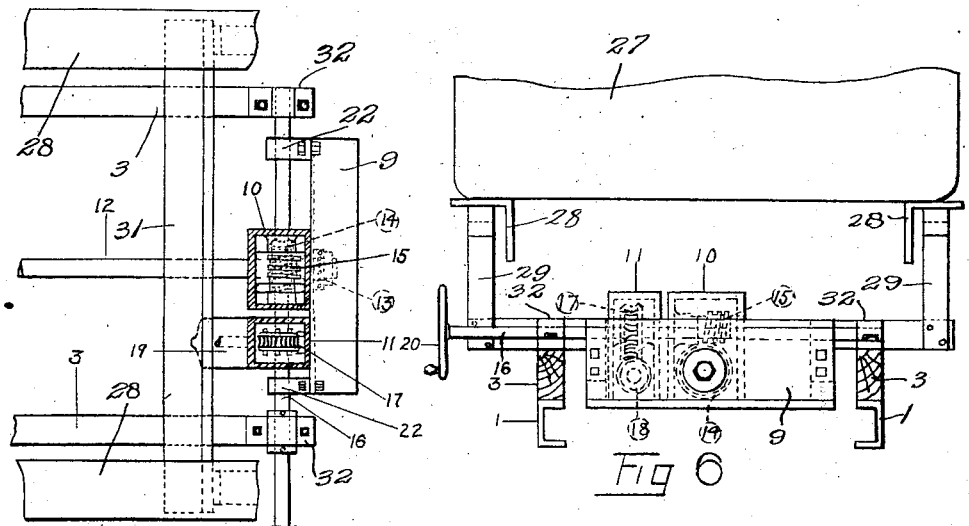
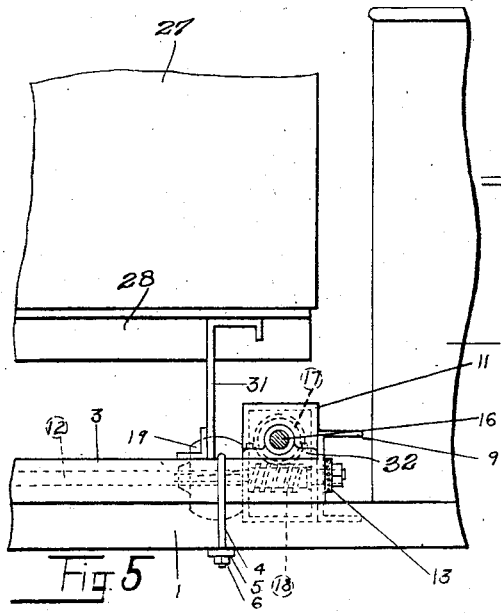
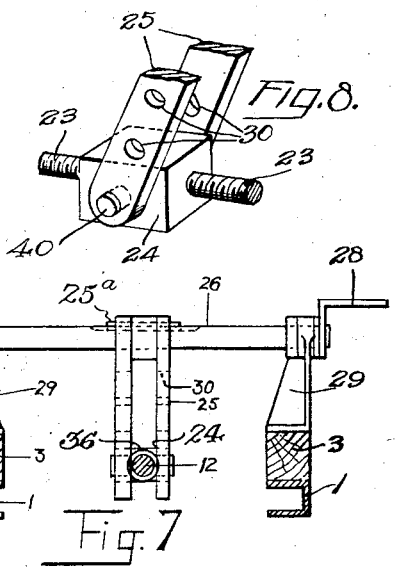
INVENTOR.
John C. Gay
Ralph E. Smith
Harry J. Quirk
BY Toulmin & Toulmin
ATTORNEYS.

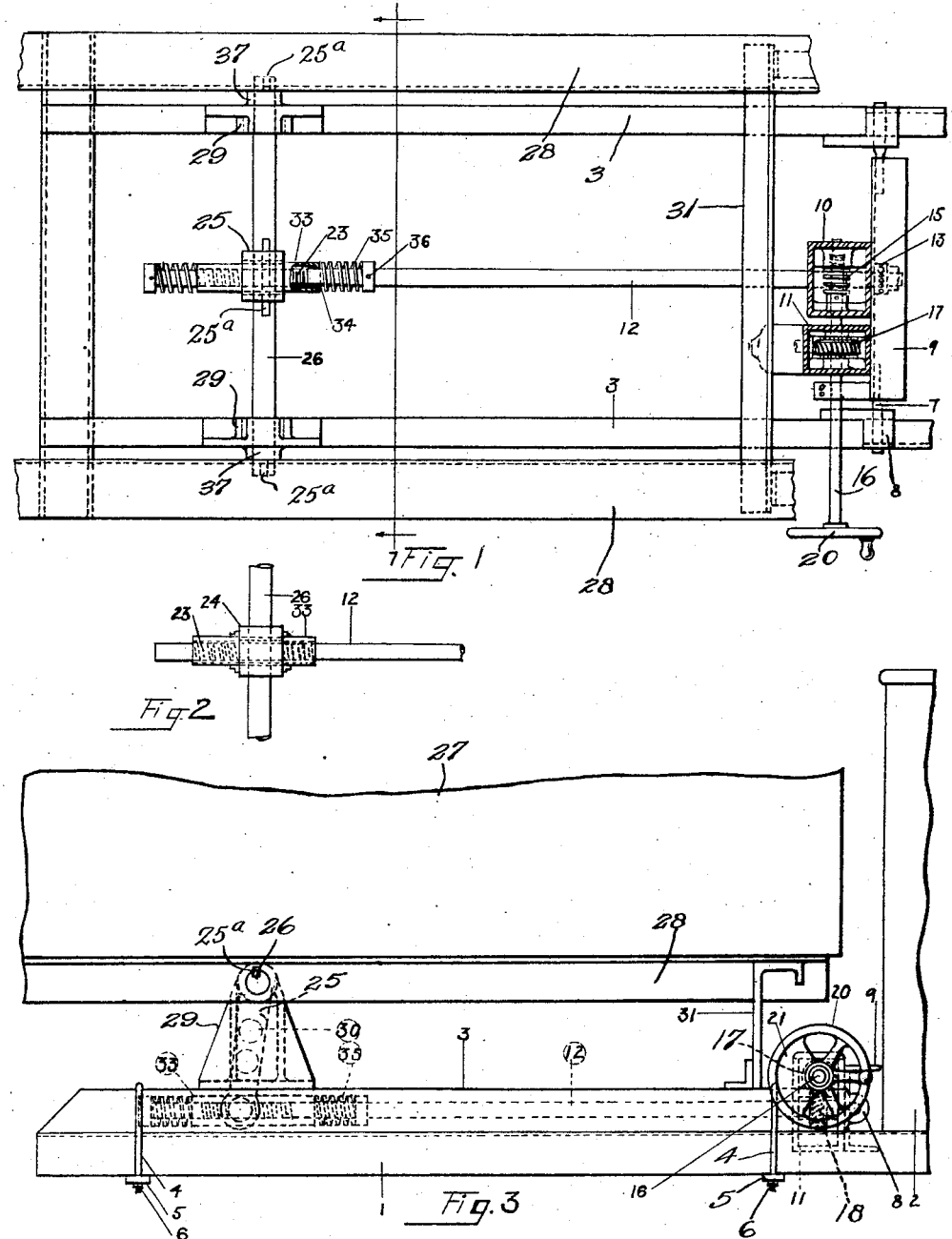

Patented Apr. 13, 1926.

1,580,241

UNITED STATES PATENT OFFICE.

JOHN C. GAY, RALPH E. SMITH, AND HARRY J. QUIRK, OF GALION, OHIO, ASSIGNORS TO THE GALION METALLIC VAULT COMPANY, OF GALION, OHIO, A CORPORATION OF OHIO.

VEHICLE BODY.

Application filed June 29, 1923. Serial No. 648,554.

*To all whom it may concern:*

Be it known that we, JOHN C. GAY, RALPH E. SMITH, and HARRY J. QUIRK, citizens of the United States, residing at Galion, in the county of Crawford and State of Ohio, have invented certain new and useful Improvements in Vehicle Bodies, of which the following is a specification, reference being had therein to the accompanying drawing.

Our invention relates to vehicle bodies, and in particular to means of changing the position of such bodies on the equipment upon which they are mounted for the purpose of dumping the bodies of the contents thereof.

The object of our invention is to provide a dump body which will have a single pivotal mounting upon the frame of the supporting truck.

It is a further object to provide a simple means of raising and lowering the body, which may be easily controlled by the operator, who can regulate the speed and degree of dumping.

It is a further object to provide a mechanism which is capable of maintaining the body at any predetermined angle without undue strain upon the mechanism.

It is a further object to provide an elevating means capable of applying great power with the minimum of actual power necessary for the purpose.

It is a further object to provide an elevating mechanism which may be either hand or power driven.

It is a further object to provide a standard elevating mechanism for different types of bodies and trucks, which is applicable either to rear dumping or side dumping.

It is a further object to provide such mechanism that it will be self-adjusting, thus relieving the strain upon the several parts, and providing a floating construction which will prevent breakage of the mechanism.

It is an additional object to provide a system of bearings to take the thrusts peculiar to this type of construction.

It is an additional object to provide a combined elevating mechanism, supporting frame, and body which may be detachably mounted upon standard truck bodies without interfering with the running gear and without the modification of the truck in any way, thus enabling the equipment to be sold to truck users after the trucks leave the factory.

It is a further object to provide an elevating and lowering mechanism which is not only strong and powerful, but which is capable of being operated within a very brief period, so that the truck will only be employed in the dumping operation a minimum time.

Referring to the drawings:

Figure 1 is a plan view of the truck frame, the elevating mechanism partially in section, and of the body frame.

Figure 2 is a detail of the protecting sleeve protecting the main operating worm.

Figure 3 is a side elevation of the mechanism.

Figure 4 is a detailed plan view, partially in section, of the elevating mechanism of a modified construction.

Figure 5 is a side elevation of the power end of the elevating mechanism.

Figure 6 is an end elevation looking rearwardly at the power end of the elevating mechanism.

Figure 7 is a section on the line 7—7 of Figure 1, looking in the direction of the arrows, with the protecting casing, collar, and spring removed adjacent the main work for the purpose of clearance.

Figure 8 is a detail view showing the pivoted block for the main operating shaft.

Referring to the drawings in detail:

1 is a truck frame upon which is mounted at the forward end the usual driver's cab 2. Mounted upon this truck frame 1 are the side frame members 3, which carry the elevating mechanism and the truck body. These side frame members 3 may be fastened to the truck frame member 1 in any suitable manner. We have shown a typical installation in the drawings, in which U-bolts 4 are used to engage the parts with one another. A cross-strap 5 passes between the free ends of the U-bolt beneath the truck frame 1, and is held in clamping position by the nuts 6 on the ends of the bolts. The particular form of mounting the supplementary frame upon the truck frame is not essential.

Carried upon the forward end of the supplementary frame upon the laterally extending pivots 7, which are mounted in collars 8, carried on the end of the supplementary frames 3, is a U-shaped beam 9. This beam carries respectively the main shaft gear box 10 and the driving gearing gear box 11. The main shaft 12 has its forward end carried in the ball thrust bearing 13, which is mounted upon the frame 9. This shaft 12 passes through the gear box 10, and has mounted thereon a worm wheel 14, which meshes and is driven by a worm 15, mounted on a cross shaft 16. This cross shaft passes through the power gear box 11, and carries thereon a worm wheel 17. This worm wheel 17 engages with a worm 18, which is connected to the armature of an electric motor 19. When such a connection is present, the hand wheel 20 is removed from the outer end of the shaft 16. If it is desired to have a hand-operated elevating mechanism, the wheel 20 is mounted upon the shaft 16. This wheel is counterbalanced by the weight 21, so that the mechanism is easily operated by hand. The shaft 16 is journaled in a bracket 22, carried by the oscillating frame 9. This frame moves or floats on its pivots 7, due to the fact that the main operating shaft 12, which is threaded at 23, works in a block 24. This block is carried between the depending arms 25 at the lower end thereof by trunnions 40 receivable in the openings 30 in the arms. The arms in turn are rigidly mounted as shown at 25ª upon a cross shaft 26, which supports the body 27, by having its side frame members 28 directly secured to the shaft 26. This supporting shaft 26 is journaled in the brackets 29, which are carried on either side of the supplementary frame members 3.

Thus as the worm 23 moves through the block 24, the arms 25 will describe an arc, and consequently the shaft 12 will move about the pivots 7, carrying with it the gear boxes and gearing. The elevation of the block 24 in the arms 25 may be changed by locating it in any one of the receiving openings 30 in the arms 25.

It will be understood that we desire to comprehend within our invention such modifications as may be fairly embraced within it, and as may be found necessary in adapting it to various conditions in the art in the course of the application of the invention.

By this arrangement, it is thus possible to have a single pivotal support for the entire body. The forward end of the body rests upon the brackets 31 carried by the forward end of the supplementary frame members. When the hand wheel or the motor is operated, then the body may be elevated or lowered to position at any speed desired, and always positively, due to the nature of the gearing. The use of worms and worm wheels secures a very powerful arrangement with the minimum of power applied, and also permits of the easy control of the mechanism, so that it can not suddenly accelerate its speed when the weight of the load passes over dead center, thus obviating not only a disastrous operation, but also considerable damage to the mechanism.

The floating feature of the forward end of the shaft 12 plus the use of the ball thrust bearing, eliminates any strain upon the gearing or buckling of the shaft.

In the alternate form shown in Fig. 4, where the degree of movement in the arms 25 is slight, it is possible to mount the operating shaft 16 in a bracket 32 carried by the supplementary frame members 3, and the loose fitting of the parts will accommodate the necessary adjustments; but this is not the preferred form.

In order to protect the main worm 23, it is desired to provide a housing 33, which has a sleeve closed at 34, preferably by a washer.

This sleeve may be loosely mounted on the shaft and pressed into position against the block 24 by the helical spring 35, one end of which abuts against the sleeve and the other against the pin 36, and its collar.

Or, as shown in the alternate form, the sleeve may be welded upon the block and closed at either end, so as to exclude dust and dirt while permitting the free movement of the worm therethrough.

Any desired form of protection of this character may be employed.

In order to prevent the lateral shifting of the body frame and body upon the main shaft 26, which is itself pivotally supported, we provide collars 37 on either side of the frame 29.

It will be understood that we desire to comprehend within our invention such modifications as may be fairly embraced within it, and as may be found necessary in adapting it to various conditions in the art in the course of the application of the invention.

Having thus fully described our invention, what we claim as new, and desire to secure by Letters Patent, is:

1. In combination, a truck body, a supplementary frame, means for pivotally supporting the truck body near the rear of the frame and to the rear of the center of the truck body, a support for the truck body carried by the supplementary frame at the front end thereof, arms fixed to and depending from said pivotal connection, an operating shaft connected with said arms for moving them fore and aft of the frame, and means for operating said shaft to raise and lower said truck body.

2. In combination, a truck body, a supplementary frame, means for pivotally supporting the truck body near the rear of the frame and to the rear of the center of the truck body, a support for the truck body carried by the supplementary frame at the front end thereof, arms fixed to and depending from said pivotal connection, an operating shaft connected with the said arms for moving them fore and aft of the frame, and means for operating said shaft to raise and lower said truck body, said operating means being mounted upon a frame pivotally supported on said supplementary frame, whereby the several parts will be adjusted in position, depending upon the angle of said arms and of said body.

3. In combination, a truck body, a supplementary frame, means for pivotally supporting the truck body near the rear of the frame and to the rear of the center of the truck body, a support for the truck body carried by the supplementary frame at the front end thereof, arms fixed to and depending from said pivotal connection, an operating shaft connected with said arm for moving it fore and aft of the frame, means for operating said shaft to raise and lower said truck body, said operating means being mounted upon a frame pivotally supported on said supplementary frame, whereby the several parts will be adjusted in position, depending upon the angle of said lever and of said body, and a thrust bearing carrying the forward end of said shaft mounted on said pivotal frame.

4. In combination, a truck body, a supplementary frame, means for pivotally supporting a truck body near the rear of the frame and to the rear of the center of the truck body, a support for the truck body carried by the supplementary frame at the front end thereof, arms fixed to and depending from said pivotal connection, an operating shaft connected with said arm for moving it fore and aft of the frame, means for operating said shaft to raise and lower said truck body, said operating means being mounted upon a frame pivotally supported on said supplementary frame, whereby the several parts will be adjusted in position, depending upon the angle of said lever and of said body, and a motor carried on said pivotally mounted frame, connected to said operating shaft.

5. The combination in a dump body construction of side frame members adapted to be mounted upon a vehicle, an end frame member pivotally mounted on the side frame members, gear boxes and gearing mounted on said pivotally mounted frame, means of actuating said gearing mounted on said frame, a main operating shaft connected to said gearing at one end and to an elevating lever at the other, an elevating lever fixed to a transverse shaft adjacent the rear of said side frame members, a dump body mounted on said transverse shaft, a bracket to support the forward end of said body, and means to permit of the changing of the position of said main shaft relative to said lever, whereby said lever is moved in an arc, and the body will be dumped and returned to its initial position.

6. In combination in a dump body construction, supporting side frame members, a transversely located end frame member pivotally mounted on the side frame members, a main operating shaft, a gear box supporting one end of said shaft and gearing connected to said shaft, said box being located on the transverse end frame member, a transverse operating shaft mounted on said end frame member, a hand wheel mounted on the free end of said shaft adjacent one of the side frame members, a dump body pivotally mounted upon said side frame members, a depending arm fixed to said dump body adjacent its pivotal connection carrying a block at the lower end thereof to receive the end of the main shaft, a thread in said block, and a worm on said shaft engaging therewith, whereby as said shaft is operated in either direction the body will be elevated or depressed about its pivotal mounting.

7. In combination, a supporting frame, a transversely located frame pivotally mounted on the supporting frame, a main shaft having one end mounted in said transverse frame which is adapted to move about its pivotal supports with said main shaft, to preserve the predetermined relationship between the transverse frame and the main shaft, a transverse operating shaft mounted on said transverse frame, interconnecting gearing between said shafts, a source of power for operating the transverse shaft mounted on said transverse frame, suitably connected with the transverse shaft by gearing, a dump body pivotally mounted on a transverse shaft mounted in brackets on the frame members, depending arms from said transverse shaft, a block carried in said depending arms having a thread therein adapted to engage with a worm on the end of the main shaft, and a supporting bracket for the forward end of the dump body, whereby when the main shaft is operated the body may be elevated or lowered.

8. In combination, a supporting frame, a transversely located frame pivotally mounted on the supporting frame, a main shaft having one end mounted in said transverse frame which is adapted to move about its pivotal supports with said main shaft, to preserve the predetermined relationship between the transverse frame and the main shaft, a transverse operating shaft mounted on said transverse frame, interconnecting gearing between said shafts, a source of power for operating the transverse shaft mounted on said transverse frame, suitably connected with the transverse shaft by gearing, a dump body pivotally mounted on a transverse shaft mounted in brackets on the frame members, depending arms from said transverse shaft, a block carried in said depending arms having a thread therein adapted to engage with a worm on the end of the main shaft, and a supporting bracket for the forward end of the dump body, whereby when the main shaft is operated the body may be elevated or lowered, and means for adjusting the position of said block in the depending arms.

9. In combination, a supporting frame, a transversely located frame pivotally mounted on the supporting frame, a main shaft having one end mounted in said transverse frame which is adapted to move about its pivotal supports with said main shaft, to preserve the predetermined relationship between the transverse frame and the main shaft, a transverse operating shaft mounted on said transverse frame, interconnecting gearing between said shafts, a source of power for operating the transverse shaft mounted on said transverse frame, suitably connected with the transverse shaft by gearing, a dump body pivotally mounted on a transverse shaft mounted in brackets on the frame members, depending arms from said transverse shaft, a block carried in said depending arms having a thread therein adapted to engage with a worm on the end of the main shaft, a supporting bracket for the forward end of the dump body, whereby when the main shaft is operated the body may be elevated or lowered, means for adjusting the position of said block in the depending arms, and means for protecting the worm operating in the block in the arms.

10. The combination in a dump body construction of side frame members, a transverse frame mounted thereon, a main operating shaft located between said side frame members, a worm on the rear end of said shaft engaging with a block, a block carried by depending arms, depending arms, a transverse shaft carrying said arms mounted in brackets above said frame members, brackets mounted on said frame members adapted to support said shaft, a body fixed to said shaft, a forward support on said side frame members for supporting the forward end of the dump body, a worm wheel on the forward end of the main shaft, a worm engaging therewith carried on a transverse shaft, a transverse shaft, a hand wheel mounted on said shaft, said hand wheel being counterbalanced, and a ball thrust bearing for supporting said main shaft in the transverse frame member.

11. The combination in a dump body construction of side frame members, a transverse frame mounted thereon, a main operating shaft located between said side frame members, a worm on the rear end of said shaft engaging with a block, a block carried by depending arms, depending arms, a transverse shaft carrying said arms mounted in brackets above said frame members, brackets mounted on said frame members adapted to support said shaft, a body fixed to said shaft, a forward support on said side frame members for supporting the forward end of the dump body, a worm wheel on the forward end of the main shaft, a worm engaging therewith carried on a transverse shaft, a transverse shaft, a motor carried by the transverse frame member, a worm on said motor, a worm wheel on the transverse shaft, a gear box enclosing said gearing, and a bracket supporting said transverse shaft at one end while the other end is supported in one of said gear boxes.

12. The combination in a dump body construction of side frame members, a transverse frame mounted thereon, a main operating shaft located between said side frame members, a worm on the rear end of said shaft engaging with a block, a block carried by depending arms, depending arms, a transverse shaft carrying said arms mounted in brackets above said frame members, brackets mounted on said frame members adapted to support said shaft, a body fixed to said shaft, a forward support on said side frame members for supporting the forward end of the dump body, a worm wheel on the forward end of the main shaft, a worm engaging therewith carried on a transverse shaft, a transverse shaft, a motor carried by the transverse frame member, a worm on said motor, a worm wheel on the transverse shaft, a gear box enclosing said gearing, a bracket supporting said transverse shaft at one end while the other end is supported in one of said gear boxes, and means for adjustably locating the rear end of the main shaft with respect to the depending arms.

In testimony whereof, we affix our signatures.

JOHN C. GAY.
RALPH E. SMITH.
HARRY J. QUIRK.